May 27, 1952 W. J. O'BRIEN 2,598,290
AREA IDENTIFICATION SYSTEM
Filed Aug. 27, 1945 3 Sheets-Sheet 1

INVENTOR.
WILLIAM J. O'BRIEN,
BY
Harold W. Mattingly
ATTORNEY.

May 27, 1952     W. J. O'BRIEN     2,598,290
AREA IDENTIFICATION SYSTEM
Filed Aug. 27, 1945     3 Sheets-Sheet 2

INVENTOR.
WILLIAM J. O'BRIEN,
BY
ATTORNEY.

May 27, 1952  W. J. O'BRIEN  2,598,290
AREA IDENTIFICATION SYSTEM
Filed Aug. 27, 1945  3 Sheets-Sheet 3

INVENTOR.
WILLIAM J. O'BRIEN,
BY
ATTORNEY.

Patented May 27, 1952

2,598,290

UNITED STATES PATENT OFFICE 2,598,290

AREA IDENTIFICATION SYSTEM

William J. O'Brien, London, England, assignor to The Decca Record Company, Limited, London, England, a corporation of Great Britain Application August 27, 1945, Serial No. 612,986

20 Claims. (Cl. 343—105)

My invention relates to an area identification system for use with radio frequency navigation systems and has particular reference to a method and apparatus for identifying large geographical areas or sectors as an aid in guiding the navigation of mobile vehicles.

In my copending application Serial No. 612,987, filed August 27, 1945, and entitled "Navigation System," now abandoned I have disclosed a radio frequency navigation system which provides for continually indicating the geographical location of a mobile vehicle equipped with the proper receiving and indicating apparatus. As is explained in that application, the operation of the system depends upon the geographical location of the vehicle being known at the time the system is placed in operation to permit the location indicator to be set to a correct corresponding reading. Once set, the indicators will then operate to continually indicate the geographical location of the vehicle as it moves from place to place. One disadvantage of such a system lies in the fact that in certain circumstances as, for example, when the system is used in the prosecution of a war, it is difficult to know with precision the geographical location of all of the vehicles at the time the system is placed in operation.

The present invention is directed to an improvement on the system disclosed in my aforementioned copending application for obviating this disadvantage.

It is, therefore, an object of my invention to provide an area identification system for use with radio frequency navigation systems and which operates from time to time to identify the area or sector within which the vehicle is moving.

It is also an object of my invention to provide a system of the character set forth in the preceding paragraph in which during the area or sector identification operation of the system a coarse position indication is given having a precision of the order of magnitude of 1/100th that provided during the normal operation of the navigation system.

It is an additional object of my invention to provide an area identification system of the character set forth in the preceding paragraphs in which a sector identification is provided by means of an audio frequency modulation of the navigation frequency transmitters.

It is a still further object of my invention to provide a system of the character set forth in the preceding paragraphs in which a change in the operational spacing of the transmitting antennae is employed to provide a sector identifying equi-phase displacement field pattern.

It is also an object of my invention to provide a system of the character set forth hereinbefore in which the frequency of the radio frequency transmissions is shifted slightly from time to time to shift the coordinate system defined by the radio frequency fields to thereby permit an identification of the sector in which the vehicle is located through a measurement of the magnitude of the shift in the coordinate system.

Other objects and advantages of my invention will be apparent from a study of the following specifications, read in connection with the accompanying drawing, wherein:

Fig. 1 is a diagrammatic view illustrating the equi-phase displacement pattern produced by two of a plurality of radio frequency transmitters operating in accordance with the disclosure in my aforementioned copending application Serial No. 612,987 and illustrating by means of dashed lines a coarse field pattern serving as an area or sector identifying coordinate system and derived from an audio frequency modulation of the radio frequency transmitters;

Figure 2:
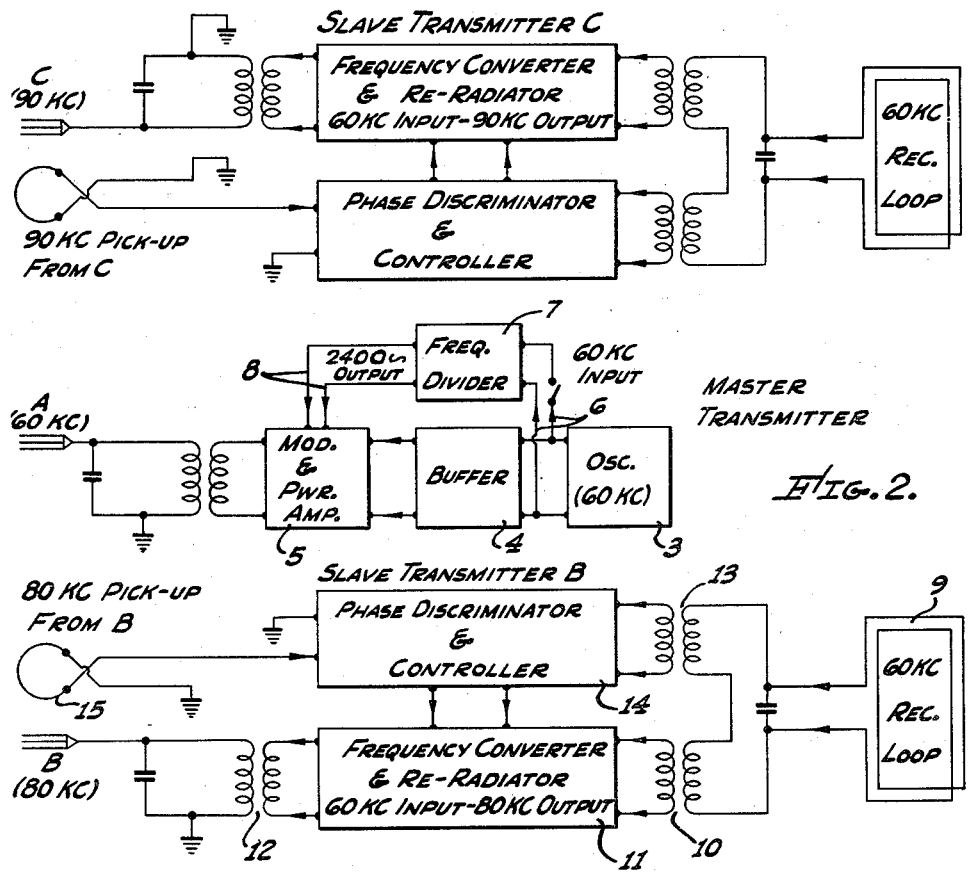
Fig. 2 is a block diagram illustrating the manner in which a radio frequency navigation system of the character disclosed in my aforementioned copending application may be so operated as to provide an audio frequency modulated radio frequency output.

Referring to the drawings, I have illustrated diagrammatically the equi-phase displacement radio frequency field pattern produced by the simultaneous operation of two transmitters A and B. These two transmitters comprise two of the plurality of transmitters used in the radio navigation system disclosed in my copending application Serial No. 612,987. As is explained in that application, the transmitters A and B are operated at different but related frequencies, frequencies of 60 and 80 kilocycles being illustrated and described in this application by way of example only, it being understood that different frequencies may be used, as desired.

The transmitters A and B are operated at a fixed multiple phase relation so that the phase angle between signals simultaneously received at any point from the transmitters A and B remain constant when the phase comparison is made on the basis of a reference frequency equal to the least common multiple of transmission frequencies. In the assumed example of transmissions at 60 and 80 kilocycles, the phase comparison is made on the basis of a reference frequency of 240 kilocycles.

Figure 1:
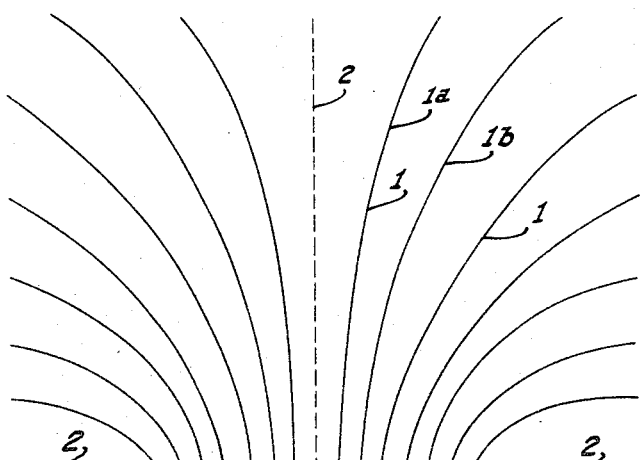

In Fig. 1 I have indicated, by means of the solid lines 1, contours of equal phase displacement as measured on the basis of a 240 kilocycle reference frequency. For convenience in illustration, the only lines shown are those representing an in-phase condition of a phase angle of zero degrees. Additional contour lines may be drawn between the contour shown in Fig. 1 to represent smaller subdivisions of an electrical cycle, it being understood that in proceeding from one of the lines 1 to an adjacent one of the lines 1 (as from line 1a to the line 1b), the phase relation between the received signals as measured on the basis of the reference frequency will progressively change from zero degrees to 360°. It will also be realized that the lines 1 are hyperbolas but that at distances from the transmitters A and B which are great with respect to the spacing between the transmitters, the lines are substantially straight and lie very close to their asymptotes. The phase angle between received signals at any point is given by the equation $$\phi = \theta + 720 \, S \sin a$$

where $\theta$ is the absolute phase angle between the transmissions from the transmitters A and B, S is the spacing of the transmitters A and B in wavelengths of the reference frequency, and $a$ is the angle between a line joining the point at which the phase angle measured with the midpoint between the transmitters A and B and a perpendicular bisector of the line joining A and B.

From the above equation it will be seen that the number of zero degree contour lines 1 which is defined between the transmitters A and B is a function of the spacing of the transmitters. This spacing is ordinarily so chosen as to produce a great number of the zero degree contour lines 1 as, for example, two hundred. A fewer number has been shown in Fig. 1 for convenience in representing the character of the pattern produced. Also, in Fig. 1, I have shown, by means of dashed lines 2, the field pattern produced by an audio frequency modulation of the transmissions from the antennae A and B. The modulating frequency is preferably so chosen as to produce two zero degree displacement lines such as are shown in Fig. 1. This is accomplished by choosing an audio frequency such that the spacing between the transmitters A and B is one audio frequency wavelength.

Assuming that the transmitters are spaced apart one hundred wavelengths at 240 kilocycles to produce two hundred of the zero degree contour lines 1, then the reference audio frequency would be 1/100 the reference radio frequency or 2400 cycles.

I have illustrated in Fig. 2 a transmitting apparatus similar to that shown in my above mentioned copending application but modified to provide for the proper audio frequency modulation of the transmitted radio frequency. As is disclosed in Fig. 2, the antenna A is excited from a master transmitter comprising an oscillator 3 for producing a 60 kilocycle signal working through a buffer stage 4 to a modulator and power amplifier 5, the output of which is suitably coupled to the antenna A. A portion of the oscillator output is conveyed, as by conductors 6, to a frequency dividing circuit 7 serving to effect a one to twenty-five change in frequency. The resulting 2400 cycle output is applied as by means of conductors 8 to the modulator 5 operating in the conventional manner to modulate the radio frequency energy transferred to the antenna A.

The frequency divider circuit 7 may be of the character disclosed in my copending application Serial No. 612,990, filed August 27, 1945, and entitled "Frequency Divider Circuits", now Patent 2,483,556 issued October 4, 1949. The transmitter B shown on Fig. 1 is operated as a slave transmitter receiving at the transmitter B location 60 kilocycle signals transmitted from the transmitter A. These signals are received on a suitable antenna 9 (Fig. 2) and conveyed as through a coupling unit 10 to a frequency converter and re-radiator 11 operating to convert the 60 kilocycle input into an 80 kilocycle output which is applied through a coupling unit 12 to the antenna B.

Since the 60 kilocycle input is modulated at 2400 cycles, the signals radiated from antenna B are also modulated at 2400 cycles. A portion of the energy picked up by the receiving antenna 9 is conveyed through a coupling unit 13 to one input of a phase discriminator and controller 14. The other input of this controller is coupled to a pick-up loop 15, serving to pick up 80 kilocycle energy from antenna B.

The 80 kilocycle input and the 60 kilocycle input are converted within the phase discriminator 14 to a reference frequency of 240 kilocycles and the phase angle between these signals is determined. This determination is used to effect, within the frequency converter 11, phase shifts in opposition to phase shifts detected by the discriminator 14, thus serving to maintain a fixed phase relation between the signals radiated from antenna B and those radiated from antenna A.

A more complete description of the operation of this phase controlling equipment will be found in my copending application Ser. No. 612,985, filed August 27, 1945, and entitled "Radio Frequency Transmitting Apparatus", now abandoned. For convenience, I have also shown in Fig. 2, the equipment comprising the slave transmitter C forming the other part of the navigation and area identification system, it being understood that the field produced by the interaction of the radiations from antennae A and B define one coordinate of the navigation system, whereas the fields produced by the interaction from antennae A and C define the other coordinate of the system.

Figure 3:
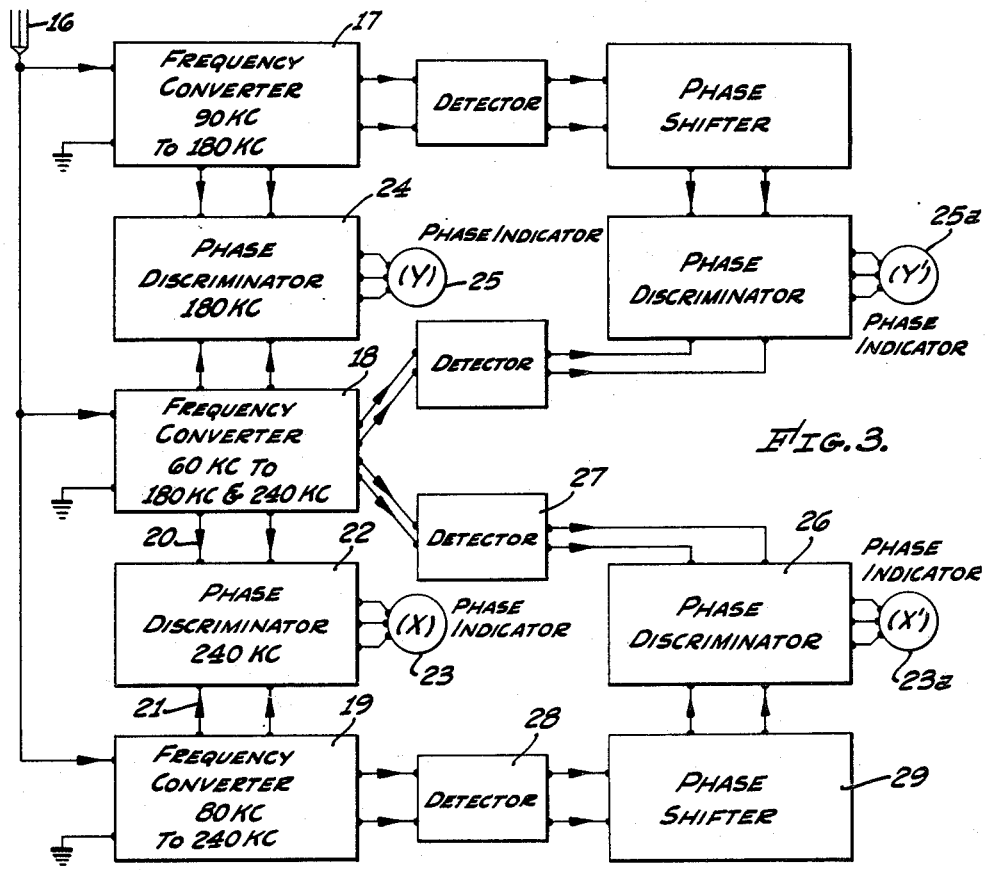
Fig. 3 is a block diagram illustrating a receiving apparatus suitable for use with the system illustrated in Figs. 1 and 2.

I have illustrated in Fig. 3 a receiving apparatus suitable for receiving the transmissions from antennae A, B and C and for indicating the precise coordinate, as well as the sector location of a vehicle carrying such a receiving apparatus. The signals radiated from antennae A, B and C are simultaneously picked up on a receiving antenna 16. These signals are applied to three frequency converters and amplifiers 17, 18 and 19 tuned to 90, 60 and 80 kilocycles, respectively. The frequency converters 18 and 19 provide 240 kilocycle outputs which are conducted as indicated at 20 and 21 to a phase discriminator 22 serving to actuate a phase indicator 23 to indicate the relative phase relation between the received signals.

In a similar manner, a phase comparison is made by a phase discriminator 24 between the transmissions from the antennae A and B and the determined phase angle is indicated on a phase indicator 25. The apparatus thus far described is identical to that described in my aforementioned copending application Serial No. 612,987.

The phase indicators 23 and 25 are preferably of the type disclosed in my copending application Serial No. 612,984, filed August 27, 1945 and entitled "Dynamoelectric Machine Structure," now Patent No. 2,499,326 issued February 28, 1950 and preferably include a registering mechanism or counter for indicating accumulated changes in phase angle exceeding one cycle. Such a phase indicator and counter is described in the W. M. Goodall Patent No. 2,408,773. Thus, if the geographical location of the vehicle is known at the time the system is placed in operation, the registering portion of the indicator 23 may be set to the proper coordinate indication and the apparatus will thereafter operate to continually indicate the geographical location of the vehicle. If, however, the geographical location of the vehicle is not known at the time the system is placed in operation, the phase indicator 23 serves to indicate the phase angle between the received signals. This means that the location of the vehicle is given with respect to two adjacent zero degree contour lines 1 (Fig. 1), but the two lines are not identified.

The apparatus represented diagrammatically in Fig. 3 includes auxiliary phase indicators 23a and 25a for indicating the phase angle between the audio frequency modulation of the transmitted signals to thereby define the geographical location of the vehicle with respect to two adjacent zero degree contour lines 2. Since there are only two such lines mutually disposed at right angles to each other, it is only necessary to know in which quadrant the vehicle is located in order to determine the two contour lines 1 between which the vehicle is located.

The phase indicator 23a is operated by a phase discriminator 26, one input of which is fed from a detector 27 coupled to the 240 kilocycle output of the frequency converter 18. Another detector 28 is coupled to the 240 kilocycle output of the frequency converter 19 and the audio frequency output from detector 28 is passed through a phase shifter 29 and applied to the other input terminals of the phase discriminator 26.

The phase shifter 29 is provided for facilitating a precision measurement of the phase angle between the audio frequency modulation of the A and B signals. In operation, the phase shifter 29 is adjusted to give an in-phase indication on the indicator 23a and the phase shift required to produce such an in-phase indication is read from the dial of the phase shifter 29. A similar apparatus is used to operate the phase indicator 25a.

It will thus be seen that the phase comparison between the audio frequency modulation of the transmitted radio frequencies serves to identify the sector within the quadrant in which the vehicle is located. Since this may be readily accomplished with a precision of better than one to one hundred, it identifies the two zero contour lines 1 which lie on either side of the vehicle. This permits the registering portion of the phase indicators 23 and 25 to be set to the appropriate coordinate indication and subdivisions of that indication are then indicated on the dial of the indicator 23. Thus, it is possible to absolutely determine with precision the geographical location of a vehicle and without requiring knowledge of the geographical location of the vehicle at the time the system is placed in operation.

Figure 4:
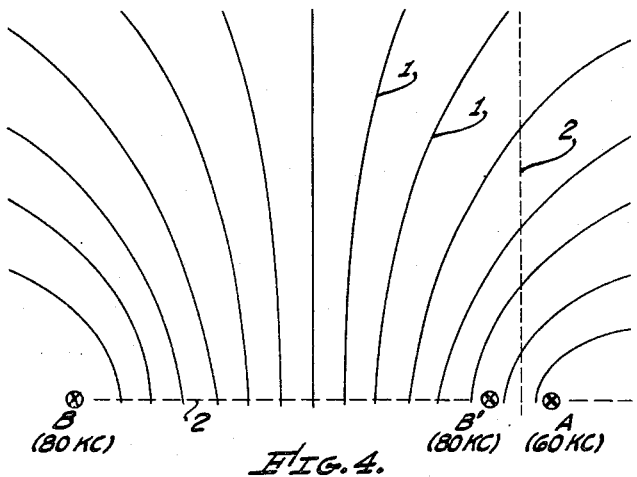
Fig. 4 is a field pattern diagram similar to Fig. 1 but illustrating the production of fine and coarse field patterns through changing in antenna spacing.

In Fig. 4 I have illustrated a modification of my invention serving to provide an area identification similar to that previously described. As is shown in Fig. 4, the zero degree phase displacement contour lines 1 are produced by the operation of antennae A and B in the manner previously described. As before, the spacing of the transmitters A and B is preferably made 100 wavelengths at 240 kilocycles to produce 200 of the zero degree contour lines 1. In Fig. 4 there is indicated also an auxiliary transmitter B' which is also operated at 80 kilocycles but which is spaced from transmitter A a distance of one wavelength at 240 kilocycles. The operation of the system contemplates operating transmitters A and B for protracted periods interrupted from time to time by operation from antennae A and B'.

When antennae A and B' are operated, the field pattern produced is such as that represented by the dashed lines 2. By choosing the spacing of antennae A and B' equal to one wavelength at 240 kilocycles, there results two of the zero degree contour lines 2. During such operation, the phase angle indicator normally comprising a part of the receiving apparatus used with the radio frequency navigation system serves to indicate the phase angle of the received signals to thereby identify the location of the vehicle with respect to two adjacent lines 2 so that if it is known in which quadrant the vehicle is located, there is provided a sufficiently accurate indication of its position to identify the two of the zero degree contour lines 1 between which the vehicle is located. The interpretation of the indications are the same as has been explained with respect to the previously described modifications of my invention.

Figure 5:
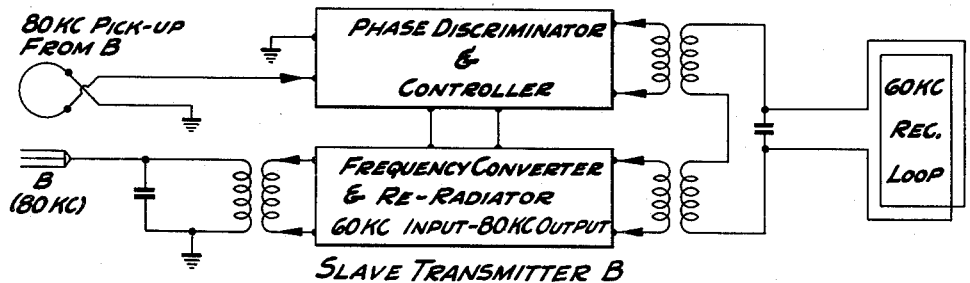
Fig. 5 is a field pattern diagram similar to Fig. 4 but illustrating by means of solid and dashed lines the effect of a shift in the operating frequency of the transmitters.
Figure 5:
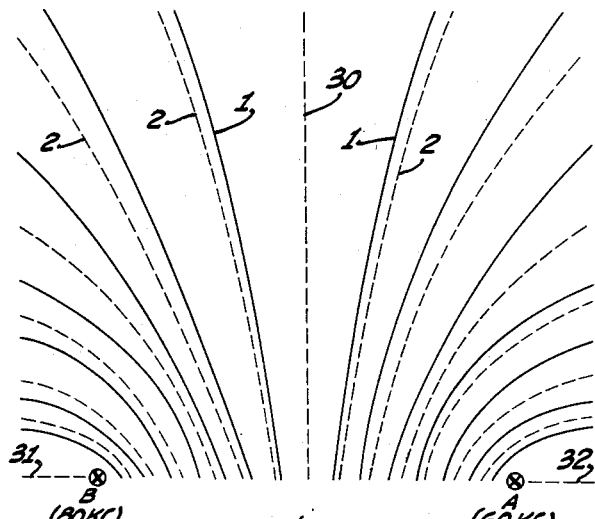

I have illustrated in Fig. 5 the equi-phase field pattern produced by an alternative mode of operation of a transmitting system of the character disclosed in my aforementioned application Serial No. 612,987 I have indicated, by means of solid contour lines 1, a field pattern such as that shown in Fig. 1 and representing operation of the transmitters A and B at 60 and 80 kilocycles, respectively. As before stated, these transmitters are spaced apart a considerable distance to produce approximately 200 of the contour lines 1, although for simplification in drawing, a fewer number have been shown in Fig. 5. In Fig. 5 there is also indicated, by means of dashed lines 2, a field pattern produced by operating the transmitters A and B at a frequency slightly different from the assigned 60 and 80 kilocycles.

Since the number of zero degree contour lines produced is equal to two times the spacing of the antennae A and B measured in wavelengths at 240 kilocycles, it will be seen that the number of such lines in a given quadrant may be reduced or increased by one through changing the transmitting frequency sufficiently to change the effective spacing between antennae A and B to one half more or one half less wavelengths.

The dashed lines in Fig. 5 illustrate the shift in field pattern when the transmitting frequency is so changed as to reduce the spacing between the transmitters A and B by one half wavelength as, for example, from one hundred wavelengths to ninety-nine and one half wavelengths. The perpendicular bisector of the line joining transmitters A and B (30 in Fig. 5) is common to both the solid and dashed line field patterns, and the same is true of extensions 31 and 32 of the line joining the transmitters A and B. However, between 30 and 31 (and also between 30 and 32) there will be ninety-nine of the contour lines 1 and ninety-eight of the contour lines 2 so that the phase shift resulting from changing the transmission frequency from 60 and 80 kilocycles to that producing the contour lines 2 will be proportional to the azimuth location of the vehicle with respect to the lines 30 and 31.

In the assumed example where there is one less of the contour lines 2 and of the contour lines 1, the exact location of the vehicle within a known quadrant will be ¼th the indicated phase shift. This results from the fact that in proceeding counterclockwise from the line 30 to the line 31, the phase shift from the lines 1 to the lines 2 increases progressively to a full 360° concurrently with a 90° rotation of the geographical location of the vehicle. Similar relationships exist for other frequencies. If, for example, the number of lines 2 in a given quadrant is two less than the number of lines 1, then the azimuth position of the vehicle may be given by ⅛th the indicated phase shift.

Figure 6:
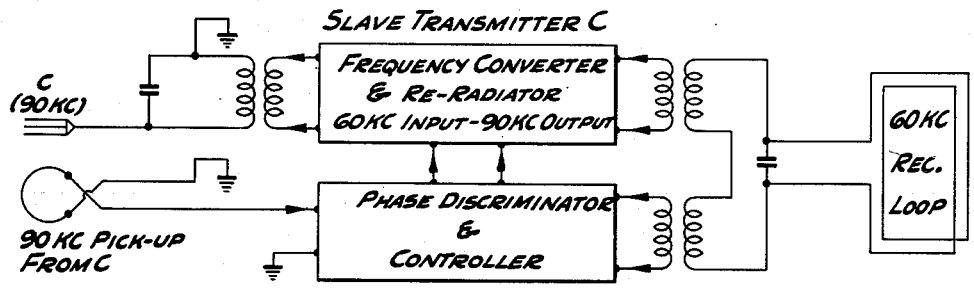
Fig. 6 is a block diagram illustrating the construction and mode of operation of a transmitting system for producing field patterns of the character disclosed in Fig. 5.
Figure 6:
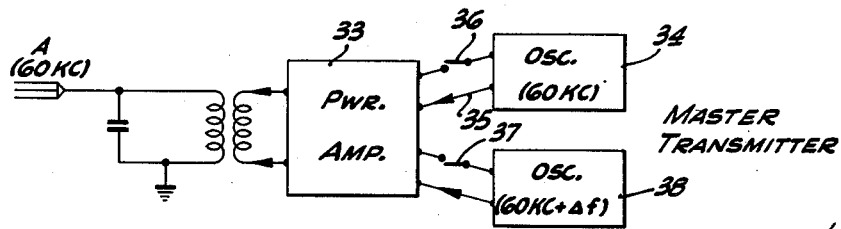

In Fig. 6, I have illustrated an apparatus similar to that shown in Fig. 2 and suitable for producing field patterns of the character shown in Fig. 5. The apparatus comprising the slave transmitters B and C are identical with that shown in Fig. 2. The master transmitter comprises a power amplifier 33 serving to supply power to the antenna A. During normal operation, this power amplifier is excited from a 60 kilocycle oscillator 34 through conductors 35, the switch 36 being closed at this time.

When it is desired to provide a sector identification in the manner above described with reference to Fig. 5, the switch 36 will be opened and a switch 37 closed, serving to excite the amplifier 33 from another oscillator 38 tuned to produce a frequency slightly different than the 60 kilocycles produced by the oscillator 34. Since the apparatus of the slave transmitters B and C operate to radiate from antennae B and C frequencies which are proportional to that radiated from antenna A, the frequency shift provided by substituting oscillator 38 for oscillator 34 appears as a proportional shift in the transmitted frequency from transmitters B and C.

While I have shown the substitution of one oscillator for another as a sample means for making a slight alteration in the frequencies of the signals from antenna A, it will be appreciated that other means may be used as, for example, a change in the frequency of oscillator 34 as by adjustment of its frequency determining circuits.

From the foregoing it will be observed that I have provided an area identification system for use with a radio frequency navigation system of the intersecting equi-phase field type to provide a coarse indication of the locations of the mobile vehicles utilizing the system to thereby identify the area or sector with respect to which the system gives an indication of the location of the vehicle.

Attention is directed to the fact that with the first described modification of my invention employing an audio frequency modulation of the radio frequency transmissions, a coarse indication is given continually. While this has the obvious advantage attendant upon a continuous indication, it has the disadvantage of producing signals which may be detected and heard by the enemy. This disadvantage is obviated in the second and third modifications described in which the antenna spacing is shifted from time to time or in which the operating frequency is shifted from time to time.

It will be noted that in all three of the described modifications, the rough coordinate system produced by the area identification system is such as to require only knowledge of the quadrant or semi-circle in which the vehicle is located. If this is known the sector position within the quadrant is given by the area identification system, whereas the normal operation of the navigation system gives a very precise indication of the location of the vehicle within that sector.

While I have shown and described the preferred embodiment of my invention, I do not desire to be limited to any of the details of construction shown and described herein, except as defined in the appended claims.

I claim:

1. The method of guiding the navigation of mobile vehicles which consists in simultaneously radiating from three spaced points radio frequency signals of different but related frequencies having a fixed multiple phase relation to produce intersecting radio equi-phase field patterns defining a fine geographical coordinate system, and modulating said signals at a lower frequency having known ratios to the frequencies modulated and having a fixed phase relation to produce intersecting lower frequency equi-phase field patterns defining a coarse geographical coordinate system.

2. The method of guiding the navigation of mobile vehicles which consists in simultaneously radiating from three spaced points radio frequency signals of different but related frequencies having a fixed multiple phase relation to produce intersecting radio equi-phase field patterns defining a fine geographical coordinate system, modulating said signals at a lower frequency having known ratios to the frequencies modulated and having a fixed phase relation to produce intersecting lower frequency equi-phase field patterns defining a coarse geographical coordinate system, separately and simultaneously receiving at the locations of said vehicles said radio frequency signals, measuring the phase relation among said radio frequency signals to determine the locations of said vehicles in terms of said fine geographical coordinate system, and measuring the phase relations among said lower frequencies to determine the locations of said vehicles in terms of said coarse geographical coordinate system.

3. The method of guiding the navigation of mobile vehicles which consists in simultaneously radiating from three spaced points radio frequency signals of different but related frequencies having a fixed multiple phase relation to produce intersecting radio equi-phase field patterns defining a fine geographical coordinate system, and from time to time radiating said signals from more closely spaced points to produce intersecting radio frequency equi-phase field patterns defining a coarse geographical coordinate system.

4. The method of guiding the navigation of mobile vehicles which consists in simultaneously radiating from three spaced points radio frequency signals of different but related frequencies having a fixed multiple phase relation to produce intersecting radio equi-phase field patterns defining a fine geographical coordinate system, from time to time radiating said signals from more closely spaced points to produce intersecting radio frequency equi-phase field patterns defining a coarse geographical coordinate system, separately and simultaneously receiving said signals at the locations of said vehicles, and measuring the phase relations among said signals to determine said locations in terms of said fine coordinate system, and from time to time in terms of said coarse coordinate system.

5. The method of guiding the navigation of mobile vehicles which consists in simultaneously radiating from three spaced points radio frequency signals of different but related frequencies having a fixed multiple phase relation to produce intersecting equi-phase field patterns defining a fine geographical coordinate system, and from time to time proportionally altering the frequencies of all of said signals by an amount of the order of magnitude of one percent while holding fixed said multiple phase relation.

6. The method of guiding the navigation of mobile vehicles which consists in simultaneously radiating from three spaced points normal radio frequency signals of different but related frequencies having a fixed multiple phase relation to produce intersecting equi-phase field patterns defining a fine geographical coordinate system, from time to time proportionally altering by a small amount the frequencies of all of said signals while holding fixed said multiple phase relation, separately and simultaneously receiving said signals at the locations of said vehicles, measuring the phase relations among said normal signals to determine the locations of said vehicles in terms of said fine coordinate system, and measuring the phase change resulting from said alternation of frequency to provide a coarse determination of the location of said vehicle.

7. In a radio frequency navigation system the combination of: means for simultaneously radiating from three spaced points radio frequency signals of different but related frequencies bearing a fixed multiple phase relation to each other to establish intersecting equi-phase field patterns defining a fine geographical co-ordinate system; and means for modulating said signals at lower frequencies bearing known ratios to the frequencies modulated and bearing a fixed multiple phase relation to each other to produce intersecting lower frequency equi-phase field patterns defining a coarse geographical co-ordinate system.

8. In a radio frequency navigation system, the combination of: transmitting means for establishing intersecting radio frequency equi-phase field patterns to define a precise geographical co-ordinate system; control means operable from time to time to alter the mode of operation of said transmitting means to thereby establish alternative intersecting radio frequency equi-phase field patterns defining a rough geographical co-ordinate system; and mobile receiving means including means for measuring the phase relation within said field patterns to thereby determine the location of said mobile receiving means in terms of both of said coordinate systems.

9. In a radio frequency navigation system, the combination of: means for simultaneously radiating from three spaced points radio frequency signals of different but related frequencies bearing a fixed multiple phase relation to each other to produce intersecting equi-phase field patterns defining a fine geographical co-ordinate system; means for modulating said signals at lower frequencies bearing known ratios to the frequencies modulated and bearing a fixed multiple phase relation to each other to produce intersecting lower frequency equi-phase field patterns defining a coarse geographical co-ordinate system; mobile receiving means for separating and simultaneously receiving said radio frequency signals; means for measuring the phase relations among said radio frequency signals to thereby determine the location of said receiving means in terms of said fine geographical co-ordinate system; and means for measuring the phase relations among said lower frequencies to thereby determine the location of said receiving means in terms of said coarse geographical co-ordinate system.

10. In a radio frequency navigation system, the combination of: means for simultaneously radiating from three spaced points radio frequency signals of different but related frequencies bearing a fixed multiple phase relation to each other to produce intersecting equi-phase field patterns defining a fine geographical co-ordinate system; and transmitting means operable from time to time to radiate said signals from more closely spaced points to produce alternative intersecting radio frequency equi-phase field patterns defining a coarse geographical co-ordinate system.

11. In a radio frequency navigation system, the combination: of transmitting means for simultaneously radiating from three spaced points radio frequency signals of different but related frequencies bearing a fixed multiple phase relation to each other to produce intersecting equi-phase field patterns defining a fine geographical co-ordinate system; and means co-acting with said transmitting means and operable from time to time to proportionately shift the frequencies of all of said signals while maintaining fixed said multiple phase relation.

12. The method of guiding the navigation of a mobile vehicle which includes the steps of simultaneously radiating from three spaced points radio frequency signals of different but related frequencies having a fixed multiple phase relation to produce intersecting radio equi-phase field patterns defining a precise geographical coordinate system, and from time to time changing said radio frequency signals from said points to change said field patterns to produce a rough geographical coordinate system.

13. The method of guiding the navigation of a mobile vehicle which includes the steps of simultaneously radiating from three spaced points radio frequency signals of different but related frequencies having a fixed multiple phase relation to produce intersecting radio equi-phase field patterns defining a precise geographical co-ordinate system, from time to time changing the radiation of said signals to change said field patterns and effect a rough geographical co-ordinate system, and measuring at the location of said vehicle the phase relations within said field patterns to determine the location of said vehicle in terms of said coordinate systems.

14. The method of guiding the navigation of a mobile vehicle which includes the steps of simultaneously radiating from three spaced points radio frequency signals of different but related frequencies having a fixed multiple phase relation to produce intersecting radio equi-phase field patterns defining a precise geographical coordinate system, and from time to time changing said signals of different but related frequencies to produce a change in the number of wave lengths separating said points and thereby define a rough geographical coordinate system.

15. In a position determining system, spaced transmitters for radiating modulated carrier waves, means at a receiving point responsive to the carrier components of said waves for providing one indication representative of the position of said receiving point relative to at least one of said transmitting points, and means at said receiving point responsive to the modulation components of said waves for providing a second indication representative of the position of said receiving point relative to at least one of said transmitting points.

16. In a position determining system, spaced transmitters for radiating waves each comprising carrier and modulation components, means at a receiving point responsive to corresponding components of said waves for providing one indication approximately representative of the position of said receiving point relative to at least one of said transmitters, and means at said receiving point responsive to the other component of said waves for providing a second indication more accurately representative of the position of said receiving point relative to at least one of said transmitting points.

17. In a position determining system, spaced transmitters for radiating waves at least a portion of which comprise two different components, means at a receiving point responsive to corresponding components of said waves for providing an indication which represents within a predetermined range the position of said receiving point relative to at least one of said transmitters, and means at said receiving point responsive to the other components of said waves for providing a second indication accurately representative of the position of said receiving point within said predetermined range, thereby accurately to define the position of said receiving point relative to said one transmitter.

18. In a position determining system, transmitters for radiating waves at spaced transmitting points at least a portion of which comprise carrier and modulation components, means at a receiving point responsive to the modulation components of said waves for providing one indication approximately representative of the position of said receiving point relative to at least one of said transmitting points, and means at said receiving point responsive to the carrier components of said waves for providing a second indication which when considered with said one indication accurately defines the position of said receiving point relative to said one transmitting point.

19. In a position determining system, spaced transmitters for radiating waves each comprising carrier and modulation components, means at a receiving point responsive to the modulation components of said waves for providing an indication which represents within a predetermined range the position of said receiving point relative to at least one of said transmitters, and means at said receiving point responsive to the carrier components of said waves for providing a second indication accurately representative of the position of said receiving point within said predetermined range, thereby accurately to define the position of said receiving point relative to said one transmitter.

20. In a position determining system having a receiving point, a pair of spaced transmitters for radiating modulated carrier waves having carrier components of different frequencies and each having modulation components, thereby to produce two sets of standing waves in space respectively characterized by a plurality of spaced equi-phase lines the spacings of which are respectively related to the wavelengths of said carrier and modulation components, means at said receiving point responsive to the carrier components of said waves for providing an indication representative of the position of said receiving point relative to one of the equi-phase lines in one of said sets, and means at said receiving point responsive to the modulation components of said waves for providing a second indication representative of the position of said receiving point relative to one of the equi-phase lines in the other of said sets, thereby to identify the one equiphase line of said one set relative to which the position of said receiving point is indicated by said one indication.

WILLIAM J. O'BRIEN.

REFERENCES CITED

The following references are of record in the file of this patent:

UNITED STATES PATENTS

| Number | Name | Date |
| --- | --- | --- |
| 1,877,858 | Hahnemann | Sept. 20, 1932 |
| 2,144,203 | Shanklin | Jan. 17, 1939 |
| 2,198,113 | Holmes | Apr. 23, 1940 |
| 2,408,773 | Goodall | Oct. 8, 1946 |

FOREIGN PATENTS

| Number | Country | Date |
| --- | --- | --- |
| 546,000 | Germany | Mar. 8, 1932 |